No. 851,206. PATENTED APR. 23, 1907.
C. O. POWELL.
TONGUE SUPPORT.
APPLICATION FILED OCT. 15, 1906.

WITNESSES:

INVENTOR
Chauncey O. Powell
BY
Adams & Brooks
ATTORNEYS

UNITED STATES PATENT OFFICE.

CHAUNCEY O. POWELL, OF HANFORD, WASHINGTON.

TONGUE-SUPPORT.

No. 851,206.　　Specification of Letters Patent.　　Patented April 23, 1907.

Application filed October 15, 1906. Serial No. 339,130.

*To all whom it may concern:*

Be it known that I, CHAUNCEY O. POWELL, a citizen of the United States of America, and a resident of the town of Hanford, in the county of King and State of Washington, have invented certain new and useful Improvements in Tongue-Supports, of which the following is a specification.

My invention relates to improvements in tongue supports for vehicles and has for its primary object to provide a device of this nature which will be comparatively simple in construction yet efficient in operation and capable of being readily fitted to the running gear of the vehicle.

With the above and other objects in view, to be referred to as the description progresses, the invention consists of the parts, arrangement and combination of parts hereinafter described and succinctly pointed out in the appended claims.

Figure 1:
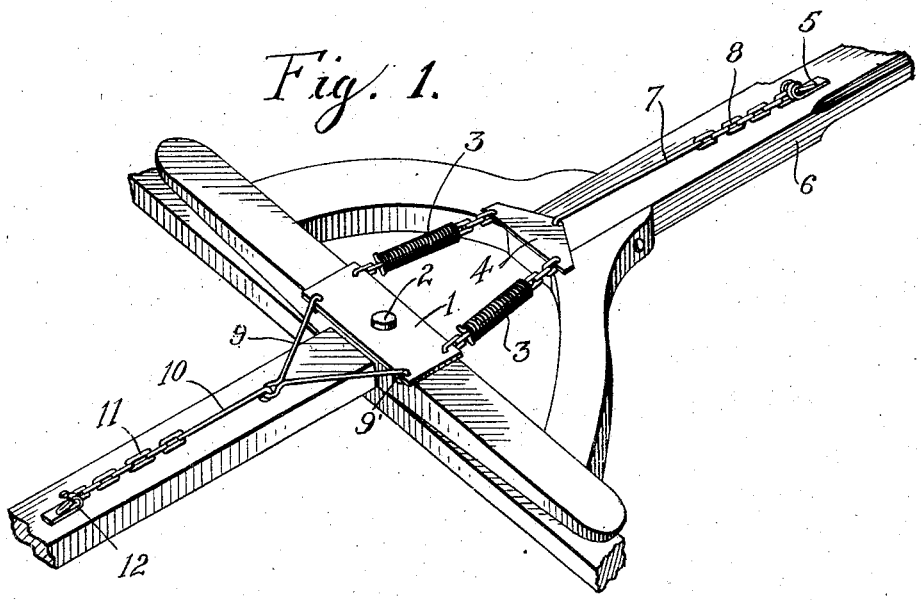
Figure 2:
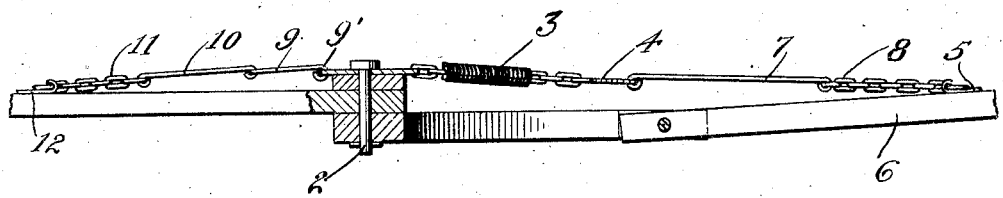
Figure 3:
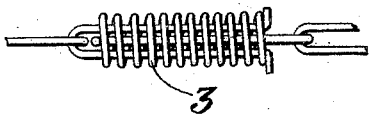

Referring now to the drawing, in which like numerals of reference indicate like parts throughout the several views: Figure 1 is a view in perspective showing the application of the present invention. Fig. 2 is a longitudinal section thereof, and Fig. 3 is an enlarged detail view.

Reference numeral 1 indicates a plate having an opening through which the king bolt 2 passes and 3 designates springs attached to said plate at spaced apart points along its forward edge.

Reference numeral 4 designates an equalizing plate adjustably connected to hook 5 secured to tongue 6, by a suitable connection consisting of the hooked rod 7 and chain 8 and to this plate the forward portions of springs 3 are secured, as shown.

Reference numeral 9 indicates an approximately V-shaped link, whose free end portions are formed into hooks 9' and engaged in apertures formed in plate 1 adjacent its rear edge portion. The closed end of said link is contracted to form a comparatively narrow seat in which the hooked rod 10 of the rear connection is engaged. The rear connection is, as now considered, similar to the connection between plate 4 and hook 5, rod 10 thereof having a suitable length of chain 11 which is engaged with hook 12 secured to the reach of the vehicle, connected to its rear end.

Hooks 5 and 12 are formed, each from a metallic plate having upwardly curved spaced portions adapted to receive therebetween one link of the adjacent chain and have the next link bear against their inner faces so as to prevent withdrawal of the link engaged between said upwardly curved portions. By this construction the chain can be quickly and effectually adjusted when desired.

Having thus described my invention what I claim as new, and desire to secure by Letters Patent of the United States of America, is:—

1. In a tongue support, a plate having an opening receiving the king bolt of the vehicle, another plate disposed in front of said first plate and having a yielding connection therewith, an approximately V-shaped link connected to said first plate and extending rearwardly thereof, a connection between said link and the reach of the vehicle, and means connected to said last plate and to the tongue of the vehicle.

2. In a tongue support, a plate formed with an opening through which the king bolt passes, an approximately V-shaped link having its free ends secured to the rear portion of said plate, the closed end of said link being formed into an elongated narrow seat, a connection engaged in the seat of said link and connected to the reach of the vehicle, and a connecting means between said plate and the tongue of the vehicle.

Signed at Seattle, Washington this 3 day of October 1906.

CHAUNCEY O. POWELL.

Witnesses:
F. J. FOSTER,
L. M. ADAMS.